United States Patent [19]

Halaby et al.

[11] 3,892,888

[45] July 1, 1975

[54] METHOD OF MAKING A MAGNETIC RECORDING AND STORAGE DEVICE

[75] Inventors: Sami A. Halaby, Raleigh, N.C.; Neal S. Kenny, Horseheads; James A. Murphy, Painted Post, both of N.Y.

[73] Assignee: Corning Glass Works, Corning, N.Y.

[22] Filed: June 9, 1971

[21] Appl. No.: 151,388

[52] U.S. Cl. ................. 427/127; 148/100, 427/127

[51] Int. Cl. ................. H01f 10/00

[58] Field of Search ................. 117/235–240; 117/107.2 R

[56] References Cited

UNITED STATES PATENTS

| | | | |
|---|---|---|---|
| 2,919,207 | 12/1959 | Schölzel | 117/235 |
| 2,978,414 | 4/1961 | Harz et al. | 117/235 |
| 3,102,048 | 8/1963 | Gran et al. | 117/237 X |
| 3,114,652 | 12/1963 | McDschetky | 117/107.2 X |
| 3,124,490 | 3/1964 | Schmeckenbecher | 117/107.2 X |
| 3,460,968 | 8/1969 | Bate et al. | 117/237 |
| 3,479,219 | 11/1969 | Haines et al. | 117/235 |
| 3,492,158 | 1/1970 | Scow et al. | 117/239 X |
| 3,498,837 | 4/1970 | Alstad et al. | 117/239 |
| 3,620,541 | 11/1971 | Comstock | 117/235 |

FOREIGN PATENTS OR APPLICATIONS

| | | | |
|---|---|---|---|
| 737,880 | 7/1966 | Canada | 117/240 |

*Primary Examiner*—Bernard D. Pianalto
*Attorney, Agent, or Firm*—Walter S. Zebrowski; Clarence R. Patty, Jr.

[57] ABSTRACT

A method of making a magnetite film or gamma ferric oxide film magnetic recording and storage device comprising the step of depositing on an inorganic and non-magnetic substrate, by chemical vapor deposition, a film of any one of the following materials: elemental iron, alpha ferric oxide, or magnetite. If a magnetite storage device is desired, a magnetite film may be deposited directly on the substrate or may be obtained by converting an iron or alpha ferric oxide film to magnetite. If a gamma ferric oxide storage device is desired, it may be obtained by converting a magnetite film to gamma ferric oxide.

24 Claims, 3 Drawing Figures

Fig. I

INVENTORS.
Sami A. Halaby
Neal S. Kenny
James A. Murphy
BY
James C. Kesterson
ATTORNEY INVENTORS.
Sami A. Halaby
Neal S. Kenny
James A. Murphy
BY
James C. Kesterson
ATTORNEY INVENTORS.
Sami A. Halaby
Neal S. Kenny
James A. Murphy
BY James C. Kesterson
ATTORNEY

METHOD OF MAKING A MAGNETIC RECORDING AND STORAGE DEVICE

CROSS REFERENCE TO RELATED APPLICATION

This application contains subject matter in common with copending application Ser. No. 151,356, U.S. Pat. No. 3,795,542, by Sami A. Halaby, Neal S. Kenny and James A. Murphy filed June 9, 1971 and titled "Method of Making a Magnetic Recording and Storage Device."

BACKGROUND OF THE INVENTION

I. Field of the Invention

This invention relates to a novel method of fabricating magnetic recording and storage devices such as tapes, drums, disks, rods and wires. Such storage devices may be used for storing digital information used in data processing computers, or any other analog or digital information where magnetic storage is desired.

II. Description of the Prior Art

Heretofore, binding materials such as epoxies, urethanes, vinyls or the like have been used for binding particles of a magnetic material to each other and to substrates or support members of a non-magnetic material for the purpose of making or manufacturing magnetic recording and storage devices. The use of such binding materials and the necessary polishing of the combination magnetic material and binding material subsequent to the application thereof to the substrate as heretofore required is time consuming and therefore adds to the cost of manufacturing such recording and storage devices.

SUMMARY OF THE INVENTION

Briefly, according to this invention an inorganic and nonmagnetic substrate or support member is provided, on a desired surface of which a film of iron, alpha ferric oxide, or magnetite is formed by chemical vapor deposition. Deposition of films by the chemical vapor deposition process of this invention comprises heating the substrate to at least 250°C., and then exposing this heated substrate to vapors of an iron compound that will not decompose when vaporized. Proper control of such parameters as temperature of the substrate and presence of absence of oxygen in the surrounding atmosphere will result in the desired selected material being formed on the substrate.

If a magnetic device with a magnetite film is desired, a magnetite film may be formed directly on the substrate during the chemical vapor deposition. If an iron film or an alpha ferric oxide film is initially formed on the substrate, the film may be converted to magnetite by subjecting said film and substrate combination to an oxidation-reduction atmosphere while said combination is maintained at no less than 300°C. For most applications, magnetite is an excellent material for a recording and storage device, however, for some applications, gamma ferric oxide may be preferable. Therefore, if gamma ferric oxide is preferred, a magnetite film can be readily converted to a gamma ferric oxide film by subjecting said magnetite film to an oxidizing atmosphere within a prescribed temperature range.

It is therefore an object of this invention to provide a simple and economical method of producing magnetic recording and storage devices.

Additional objects, features and advantages of the present invention will become apparent to those skilled in the art from the following detailed description and attached drawings.

DETAILED DESCRIPTION OF THE INVENTION

Figure 1:
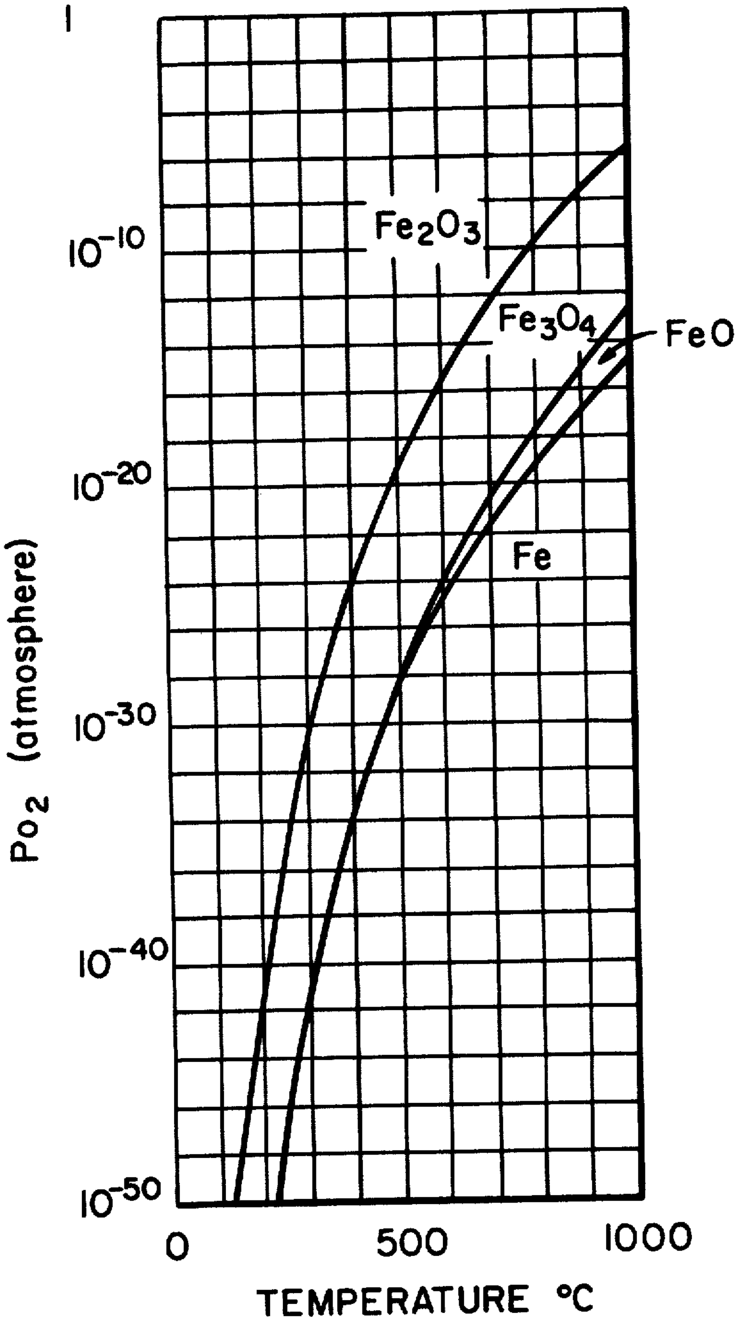
FIG. 1 is a phase diagram of the iron-oxygen system for Temperature vs. Oxygen Pressure.

A substrate or support member in the form of a disk, tape, rod, drum or wire is provided from any suitable inorganic and non-magnetic material such as but not limited to aluminum, glass, glass-ceramic or ceramic that can withstand without damage the high temperatures encountered in the method of this invention. An especially suitable substrate for the practice of this invention is ion exchange strengthened glass or glass ceramic. There are several suitable ion exchange processes well known in the art. A basic discussion of such processes may be found in a publication entitled "Stresses in Glass Produced by Non-Uniform Exchange of Monovalent Ions" by S.S. Kistler, published by the Journal of the American Ceramic Society, February 1962, pages 59–68.

Although there are several embodiments of this invention, a step basic to all of the embodiments comprises transporting the vapors of an iron compound that will not decompose when vaporized to a heated substrate where said vapors are allowed to react. Such iron compounds include but are not limited to ferrocene, $Fe(C_5H_5)_2$; iron pentacarbonyl, $Fe(CO)_5$; ferric chloride, $FeCl_3$; ferric acetylacetonate,

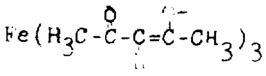

;ferrous acetylacetonate,

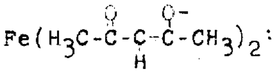

; ferric hexafluoroacetylacetonate,

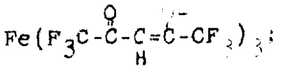

; and ferrous hexafluoroacetylacetonate.

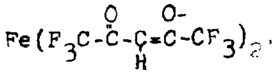

Ferrocene and iron penta carbonyl are particularly suitable for the practice of this invention.

According to the first embodiment, the substrate is simultaneously heated to a temperature between 300°C. and an upper limit, determined by structural limitations of the substrate, in a reducing atmosphere such as hydrogen, carbon monoxide or the like, and subjected to the iron compound vapors. Any suitable oxygen free method known to one skilled in the art may be used to obtain and then convey said vapors to the heated substrate. For example, if ferrocene is the iron compound, such methods would include, but not be limited to, (1) heating a ferrocene powder charge above 150°C. to vaporize the ferrocene, and then transporting the ferrocene vapors alone or with an inert or reducing carrier gas to the surface of said heated substrate; and (2) dissolving the ferrocene in benzene and then transporting the combination vapors of ferrocene and benzene alone or with an inert or reducing carrier gas to the surface of said substrate. The film deposited by such a process will be elemental iron (Fe). It should be noted that if ferrocene or iron pentacarbonyl are selected to be used as the iron compounds an atmosphere free of oxygen may be used instead of said reducing atmosphere. The resulting iron film may be of any desired thickness depending upon the future use of the magnetic storage device. However, if a magnetite or gamma ferric oxide film suitable for most present recording and storage applications is to be produced, an iron film of between 500A to 400A is preferable. The iron film is then converted into alpha ferric oxide ($\alpha$-$Fe_2O_3$) by heating any maintaining the substrate and iron film combination at a temperature between 300°C. minimum up to a maximum temperature determined by structural limitations of the substrate while said substrate and iron film are subjected to an oxidizing atmosphere such as air. The time required to convert a film of iron into alpha ferric oxide varies with the thickness of the iron film and the temperature to which the film is subjected. It has been found, however, that 10 hours at 300°C. is sufficient time to convert a 4,000A thick film of iron to alpha ferric oxide in an air atmosphere, and that a period of about 15 minutes at 450°C. is sufficient time to satisfactorily convert a 500 A thick film of iron to alpha ferric oxide in an air atmosphere. Therefore, the time to convert any iron film between about 500A and 4,000A in thickness at any temperature between 300° and 450°C. should be between about 15 minutes and 10 hours. The volume of the alpha ferric oxide film is about 2 times that of the deposited iron film, and a 1,900A thick iron film will result in approximately a 3,900A–4,000A thick alpha ferric oxide film. The substrate and alpha ferric oxide film combination may be cooled and stored as necessary, or the alpha ferric oxide film may immediately be converted to magnetite.

The following method is equally effective for converting a film of alpha ferric oxide or elemental iron to magnetite. The method of converting these films comprises heating and maintaining the film and substrate combination at a temperature of between 300°C. minimum up to a maximum temperature determined by structural limitations of the substrate while said combination is contained in an oxidation-reduction atmosphere. The term oxidation-reduction atmosphere when used herein means an atmosphere having a controlled oxygen pressure, which, when used in conjunction with elevated temperatures will result in either alpha ferric oxide being converted to magnetite or elemental iron being converted to magnetite. Magnetite is a semi-oxidized state of iron. The important consideration of the oxidation-reduction atmosphere is the oxygen pressure of the atmosphere.

FIG. 1 is a phase diagram that shows whether iron, Fe, or one of the iron-oxygen system phases, FeO, $Fe_2O_3$ or $Fe_3O_4$ will be stable at a particular temperature and oxygen pressure ($PO_2$). For example, if the magnetite phase is to be stable, the oxygen pressure must be between about $5 \times 10^{-41}$ atmosphere and $5 \times 10^{-31}$ atmosphere for a temperature of around 300°C., and between about $10^{-18}$ atmosphere and $10^{-10}$ atmosphere for a temperature of around 800°C. Because of the very low oxygen pressure necessary at temperatures less than about 800°C. an atmosphere consisting essentially of free oxygen is, for practical reasons, inconvenient, if not impossible, to use. Therefore, to obtain an atmosphere having the necessary oxygen pressure at temperatures less than around 800°C., it is desirable to use an atmosphere having essentially no free oxygen, and consisting of at least one oxygen containing compound. Atmospheres particularly suitable for use with this invention include but are not limited to a hydrogen and water ($H_2/H_2O$) mixture, a carbon monoxide and carbon dioxide ($CO/CO_2$) mixture, and a carbon monoxide and water ($CO/H_2O$) mixture. An inert gas, such as nitrogen, may be combined with these oxidation-reduction atmosphere without significantly reducing the effectiveness thereof. An atmosphere of $H_2$ and $H_2O$ in combination with $N_2$ especially suitable for use with the method of this invention may be obtained by bubbling a mixture of hydrogen and nitrogen through water. The important consideration of this particular atmosphere is the hydrogen partial pressure to water partial pressure ratio ($PH_2$:$PH_2O$). The nitrogen is inert and acts only as a carrier gas for the water so that the ratio of hydrogen to water in the system is more easily controlled. The allowable range of hydrogen partial pressure to water partial pressure ratio which will produce the necessary oxygen pressure for converting and alpha ferric oxide film or elemental iron film to magnetite will vary as the temperature of the film and substrate combination varies.

Figure 2:
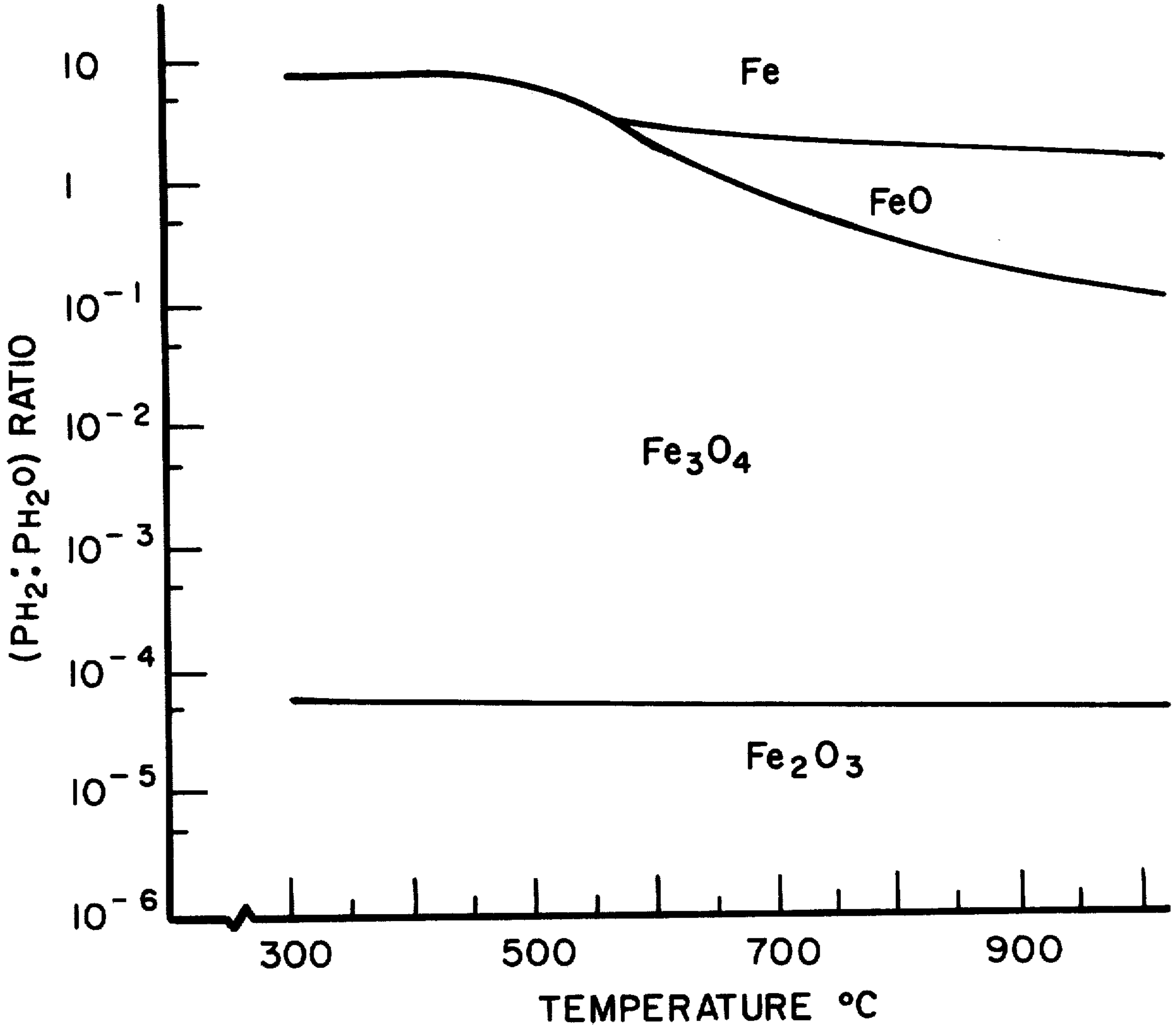
FIG. 2 is a phase diagram of the iron-oxygen system for Temperature vs. $Ph_2:PH_2O$ (hydrogen partial pressure to water partial pressure ratio).
Figure 3:
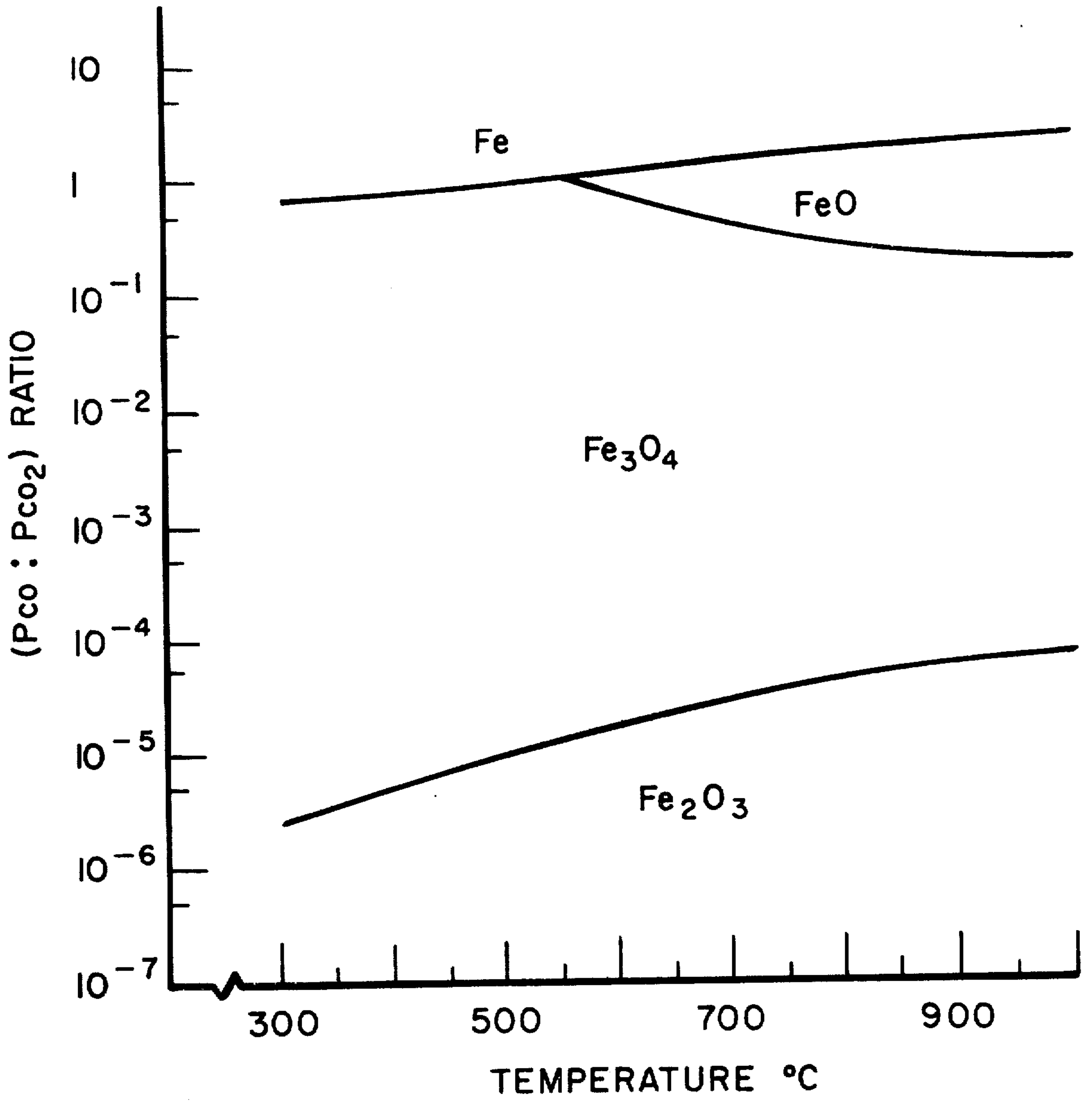
FIG. 3 is a phase diagram of the iron-oxygen system for Temperature vs. $PCO:PCO_2$ (carbon monoxide partial pressure to carbon dioxide partial pressure ratio).

FIG. 2 is a phase diagram that shows whether iron, Fe, or one of the iron-oxygen system phases, FeO, $FE_2O_3$ or $Fe_3O_4$, will be stable at a particular hydrogen partial pressure to water partial pressure ratio and temperature. For example, the allowable range of hydrogen pressure to water partial pressure ratio for a temperature of approximately 300°C. necessary to stabilize the iron-oxygen system in the magnetite phase is between approximately 8:1 and approximately $5 \times 10^{-5}$:1. That is, a hydrogen and water mixture having this range of hydrogen to water partial pressure ratios will have an oxygen pressure of between about $5 \times 10^{-41}$ and $5 \times 10^{-31}$ atmosphere. If a temperature of approximately 525°C. is used, a partial pressure ratio range between approximately 5:1 and $5 \times 10^{-5}$:1 is necessary, however, for ease of control, a range of between 3:1 and $10^{-2}$:1 is preferable. More specifically, a particularly effective oxidation-reduction atmosphere with a 2.4:1 ratio of hydrogen partial pressure to water partial pressure can be obtained by bubbling a mixture of 8 percent by volume of hydrogen and 92 percent by volume of nitrogen through water while said hydrogen, nitrogen and water is maintained at approximately 25°C. Another effective oxidation-reduction atmosphere for use with this invention is a mixture of carbon monoxide, (CO) and carbon dioxide ($CO_2$). Since both constituents of this mixture are gases the correct proportions can easily be controlled within a suitable range by the use of simple instrumentation such as a flowmeter. The important consideration of this atmosphere is the carbon monoxide partial pressure to carbon dioxide partial pressure ratio ($PCO$:$PCO_2$). FIG. 3 is a phase diagram that shows whether iron, Fe, or one of the iron oxygen system phases, FeO, $Fe_2O_3$ or $Fe_3O_4$ will be stable at a particular carbon monoxide partial pressure to carbon dioxide partial pressure ratio and temperature. For example, the allowable range of carbon monoxide partial pressure to carbon dioxide partial pressure ratio for a temperature of approximately 300°C. necessary to stabilize the iron-oxygenn system in the magnetite phase is between approximately $8 \times 10^{-1}$:1. and $3 \times 10^{-6}$:1. That is, a carbon monoxide and carbon dioxide mixture having this range of carbon monoxide to carbon dioxide partial pressure ratios will have an oxygen pressure between about $5 \times 10^{-41}$ and $5 \times 10^{-31}$ atmosphere. If a temperature of approximately 525°C. is used a partial pressure ratio of between 1:1 and $10^{-5}$:1 is necessary, however, for ease of control, a range of between 1:1 and $10^{-1}$:1 is preferable.

It is to be noted, that the iron-oxygen phase diagrams of both FIG. 2 and FIG. 3, are discontinued at the low temperature of approximately 300°C., that FIG. 1 is discontinued at pressures less than $10^{-50}$ atmosphere, and that FIGS. 1, 2 and 3 are discontinued at the high temperature of approximately 1,000°C. The diagrams are discontinued at the low temperatures since the conversion from an unstable phase to a stable phase is so slow at temperatures below about 300°C., with the exception of the conversion from magnetite to gamma ferric oxide, that all of the phases may be considered stable for a short period of time. The conversion of magnetite to gamma ferric oxide, as will be further discussed hereinafter, is rapid down to about 200°C. The diagrams are discontinued at about 1,000°C. since, as will be further explained hereinafter, it is unlikely that for the purposes of this invention higher temperatures would be desired.

Although, as was discussed heretofore, temperatures much higher than 600°C. may be used in conjunction with an oxidation-reduction atmosphere to convert an iron film or alpha ferric oxide film to magnetite, the use of temperatures higher than 600°C. may result in a slight decrease in the coercivity of the magnetite as well as other minor deleterious effects to the magnetic qualities of the magnetite film. The film and substrate are maintained in said oxidation-reduction atmosphere for a period of time between 5 minutes and 1 ½ hours. Five minutes is normally sufficient time to convert iron films of around 500A and alpha ferric oxide film of around 1,000A, and 1 ½ hours is sufficient time to completely convert iron films of around 4,000A and alpha ferric oxide films of around 8,000A. It is to be noted, however, that time periods longer than necessary will not be harmful. It has been found that the conversion process can be optimized by insuring uniform heating of the material, and excluding any free oxygen from the substrate. Further, it has been found that the speed of the conversion process increases as the temperature of the substrate and film combination is increased from between 300°C. up to approximately 525°C., but that above 525°C. speed of the process remains generally constant. Therefore, a temperature of approximately 525°C. is especially desirable for practicing this invention even though temperatures much higher may be used if the substrate can withstand such higher temperatures.

In a second embodiment, a substrate is provided, and an iron film is deposited on the substrate in the same manner as described in the first embodiment. The iron film is then directly converted to a film of magnetite by heating said iron film and substrate combination in an oxidation-reduction atmosphere as heretofore described. The resulting magnetite film will be approximately 2 times the thickness of the deposited iron.

According to a third embodiment, a film of alpha ferric oxide is deposited directly on the substrate by heating the substrate to a temperature of between 300°C. and an upper limit determined by structural limitations of the substrate and then subjecting the heated substrate to the vapors of an iron compound in an oxidizing atmosphere, such as air. The iron compound vapor is obtained in the same manner as described in the first embodiment. However, in transporting vapors to the heated substrate, carrier gases containing oxygen may be used since oxygen is desirable for this method. Furthermore, an air tight system is not necessary, and the substrate may be exposed to the atmosphere while being subjected to the iron compound vapors. The alpha ferric oxide film deposited by this method may be of any desired thickness depending upon the future use of the magnetic storage device. However, if a magnetite or gamma ferric oxide film suitable for most present recording and storage applications is to be produced, an alpha ferric oxide film of between 1,000A and 8,000A is preferable. The alpha ferric oxide is then converted to magnetite in the same manner as was described in the first embodiment.

According to a fourth embodiment of this invention a magnetite ($Fe_3O_4$) film of any desired thickness is applied to the substrate. However, for most present storage and recording applications, a 1,000A to 8,000A film is preferable. The substrate is heated to a temperature of between at least 250°C. and 900°C., and a surface of said heated substrate is then subjected to the vapors of an iron compound in an oxygen controlled atmosphere. Substrate temperatures below 250°C. may be used with some of the available iron compound vapors. However, the time period necessary to deposit a film of sufficient thickness is excessive and therefore generally unacceptable if temperatures below about 250°C. are used. The necessary temperature range varies with the type of iron compound vapors being used. Table I sets out the preferred substrate temperature and the range of substrate temperatures suitable for forming magnetite from various iron compounds. The atmosphere is controlled such that for every 3 parts of elemental iron in the iron compound vapors, at least 4 parts of oxygen will be available from the combination sources of the iron compound vapor and the controlled atmosphere to combine with the elemental iron and form magnetite. Table I also sets out the corresponding ratio of parts of iron compound vapors by mole to parts of free oxygen by mole necessary to obtain an iron-oxygen combination of 3 parts elemental iron to 4 parts oxygen.

Table I

| Iron Compound Vapors | Ratio of Vapor to Free Oxygen | Substrate Temperature Range for depositing magnetite or ga mma ferric oxide | Preferred Substrate Temp. |
|---|---|---|---|
| Ferrocene | 4:3 | 400°C.–900°C. | 500°C. |
| Ferric Pentacarbonyl | 4:3 | 250°C.–550°C. | 400°C. |
| Ferric Chloride | 4:3 | 300°C.–900°C. | 450°C. |
| Ferric Acetylacetonate | No addition of free oxygen | 250°C.–550°C. | 400°C. |
| Ferrous Acetylacetonate | No addition of free oxygen | 250°C.–550°C. | 400°C. |
| Ferric Hexafluoracetylacetonate | No addition of free oxygen | 250°C.–550°C. | 400°C. |
| Ferrous Hexafluroacetylacetonate | No addition of free oxygen | 250°C.–550°C. | 400°C. |

After being exposed to the controlled atmosphere, the substrate is allowed to cool in the controlled atmosphere.

The resulting magnetite film formed by any of the above described four embodiments, or a magnetite film formed by any other available process can be further oxidized, if desired, to magnetic gamma ferric oxide ($\alpha$ - $Fe_2O_3$). To oxidize a magnetite film and obtain a gamma ferric oxide film the substrate or support member and magnetite film are heated to a temperature between 200° and 350°C. in an oxidizing atmosphere, such as air, for a period of about 1 to 10 hours. The lower the temperature used the longer the time period that will be required. Tests have shown, that excellent results are obtained if the substrate and film combination is heated to 275°C. in air for approximately 3 hours.

According to a fifth embodiment, gamma ferric oxide can be formed on a substrate by a procedure similar to that used for depositing magnetite. For example, if a magnetite film is desired, after the substrate has been subjected to the controlled combination atmosphere of iron compound vapors and oxygen, the substrate and magnetite film are allowed to cool in said controlled combination atmosphere. However, if a gamma ferric oxide film is desired, after being subjected to the controlled combination atmosphere, the substrate and magnetite film are immediately transferred from said combination atmosphere to an oxidizing atmosphere, such as air, while said substrate is still at a temperature of at least 250°C. Said substrate and magnetite film are then allowed to cool in said oxidizing atmosphere which results in said magnetite film being converted to gamma ferric oxide.

It may be desirable at this point to again call attention to the fact that magnetic recording and storage devices made or manufactured as set forth herein do not require the use of a binding material for binding magnetic particles together or for binding the particles to the substrate as was required by the prior art. Further, the magnetic film or coatings of devices produced by the practice of this invention have excellent adherence, substantially uniform thickness, high magnetic flux density and can be applied in such thin films that the smoothness of the combination film and substrate is effectively the smoothness of the substrate. Therefore, since suitable materials, especially materials such as aluminum, glass, glass-ceramic or ceramics can be formed with, or be readily ground and polished to extremely smooth surfaces for depositing magnetic recording or storage films thereon, the resulting film and substrate combination is exceptionally smooth. Furthermore, these materials in various combinations may be readily formed into disk, drum, rod or tape substrates.

Six specific examples of embodiments of the method of this invention for producing magnetic recording and storage devices follows.

EXAMPLE I

An ion exchange strengthened glass disk shaped substrate having a thickness of 0.08 inch, an outside diameter of 14 inches, and a 6 ⅝ inch diameter center hole is heated to approximately 450°C. in an oxygen free atmosphere, while being subjected to vapors of ferrocene which are delivered to the substrate by nitrogen. The ferrocene vapors are obtained by heating a ferrocene powder charge above 150°C. The vapors are delivered to the substrate until an approximately 1,900A film of iron is deposited thereon. The iron film on the disk is then converted into an approximately 3,900A–4,000A thick film of alpha ferric oxide by heating and maintaining the substrate and said iron film in air at a temperature of approximately 450°C. for approximately 1½ hours. The film of alpha ferric oxide is then converted to magnetite by subjecting said alpha ferric oxide film to an oxidation-reduction atmosphere of $H_2$ and $H_2O$ mixed with $N_2$ at a temperature of 525°C. for approximately 1 hour. An oxidation-reduction atmosphere having a $H_2$ to $H_2O$ partial pressure ratio of 2.4:1 may be provided by bubbling a mixture of 8 percent hydrogen by volume and 92 percent nitrogen by volume through water, while said nitrogen, hydrogen and water is maintained at approximately 25°C. A device produced by the method outlined in this example will result in a magnetic recording and storage disk with approximately a 3,900A–4,000A thick film of magnetite.

EXAMPLE II

A 1,900A thick film of iron is deposited on a substrate, such s described in Example I, in precisely the same manner as descried in that example. The iron film is then converted to approximately a 3,900A–4,000A film of magnetite by the same process as was described in Example I for converting alpha ferric oxide to magnetite.

EXAMPLE III

A disk shaped substrate such as described in Example I is heated to approximately 450°C., while being subjected to iron pentacarbonyl vapors which are transported to the heated substrate by nitrogen gas. The heated substrate is open to the atmosphere so that oxygen is available at the substrate, and as the iron pentacarbonyl vapors contact the heated substrate a film of alpha ferric oxide is deposited on said substrate. The vapors are delivered to the substrate until approximately a 3,900A–4,000A film of alpha ferric oxide has been deposited on said substrate. The resulting alpha ferric oxide film is then converted to magnetite by subjecting said film to a CO and $CO_2$ oxidation-reduction atmosphere at a temperature of about 525°C. for approximately one hour. Said CO and $CO_2$ atmosphere has a CO to $CO_2$ partial pressure ratio of about $10^{-2}$:1 which can readily be determined by simple instrumentation such as a flowmeter.

EXAMPLE IV

Magnetite, $Fe_3O_4$, is directly applied to the substrate, such as described in Example I, by heating said substrate to a temperature of approximately 500°C. and then allowing vapors of ferrocene to be carried to said substrate by inert nitrogen. The heating chamber is not completely sealed to the atmosphere, such that sufficient oxygen will migrate into the chamber resulting in a combination atmosphere of approximately 4 parts oxygen to 3 parts ferrocene vapors. The substrate is subjected to such atmosphere until approximately a 3,900A–14,000A thick magnetite film has been deposited on the substrate surface. The substrate is then allowed to cool to room temperature in said atmosphere.

EXAMPLE V

A magnetic recording and storage device having a film of gamma ferric oxide as the recording and storage medium is formed by converting the magnetite film of a device formed by any one of the four previous examples. Such magnetite film is converted to gamma ferric oxide by heating said film and substrate combination to a temperature of approximately 275°C. in air for approximately 3 hours. This conversion process results in a magnetic recording and storage disk with an approximately 3,900A–4,000A thick film of gamma ferric oxide.

EXAMPLE VI

A film of gamma ferric oxide is formed on a substrate in a manner similar to that described in Example IV for applying magnetite. The only difference being that immediately after the substrate has been subjected to the combination atmosphere, and while said substrate is still at approximately 5002 C. said substrate and magnetite film are moved out of said combination atmosphere and allowed to cool in air. This process results in a film of gamma ferric oxide, of approximately 3,900A–4,000A in thickness.

Although the present invention has been described with respect to specific examples and specific methods of production it is not intended that such specific references be limitations upon the scope of the invention except insofar as is set forth in the following claims.

We claim:

1. A method of making an iron oxide magnetic recording and storage device comprising the steps of
- providing an inorganic and non-magnetic support member,
- heating said support member to a temperature of at least 300°C,
- exposing a surface of said heated support member to the vapors of an iron compound, said iron compound vapors containing substantially no metal other than iron,
- maintaining said heated support member in a reducing atmosphere while exposing it to said iron compound vapors, whereby a film of iron will be formed on said support member, and thereafter
- maintaining said support member and iron film combination at a temperature of at least 300°C in an oxidation-reduction atmosphere whereby said iron film is converted to a film of magnetite.

2. The method of claim 1 wherein said film of iron is between 500A and 4,000A in thickness.

3. The method of claim 1 wherein said oxidation-reduction atmosphere is selected from the group consisting of hydrogen and water, carbon monoxide and water, and carbon monoxide and carbon dioxide.

4. The method of claim 1 further comprising the step of maintaining said support member and magnetite film combination at a temperature of between 200° and 350°C. while exposing said combination to an oxidizing atmosphere for a period of between 1 and 10 hours, whereby said film of magnetite is converted to a film of gamma ferric oxide.

5. A method of making an iron oxide magnetic recording and storage device comprising the steps of
- providing an inorganic and non-magnetic support member,
- heating said support member to a temperature of at least 300°C,
- exposing a surface of said heated support member to the vapors of an iron compound, said iron compound vapors containing substantially no metal other than iron,

- maintaining said heated support member in a reducing atmosphere while exposing it to said iron compound vapors, whereby a film of iron will be formed on said support member,
- maintaining said support member and iron film combination at a temperature of at least 300°C while exposing said combination to an oxidizing atmosphere for between 1 and 2 hours, whereby said iron film is converted to alpha ferric oxide, and
- maintaining said support member and alpha ferric oxide film combination at a temperature of at least 300°C in an oxidation-reduction atmosphere, whereby said alpha ferric oxide film is converted to a film of magnetite.

6. The method of claim 5 wherein said film of iron is between 500A and 4,000A in thickness.

7. The method of claim 5 wherein said oxidation-reduction atmosphere is selected from the group consisting of hydrogen and water, carbon monoxide and water, and carbon monoxide and carbon dioxide.

8. The method of claim 5 further comprising the step of maintaining said support member and magnetite film combination at a temperature of between 200° and 350°C. while exposing said combination to an oxidizing atmosphere for a period of between 1 and 10 hours, whereby said film of magnetite is converted to a film of gamma ferric oxide.

9. A method of making an iron oxide magnetite recording any storage device comprising the steps of
- providing an inorganic and non-magnetic support member,
- heating said support member to a temperature of at least 300°C,
- exposing a surface of said heated support member to the vapors of an iron compound, said iron compound vapors containing substantially no metal other than iron,
- maintaining said heated support member in an oxidizing atmosphere while exposing it to said iron compound vapors, whereby a film of alpha ferric oxide will be formed on said support member, and
- maintaining said support member and alpha ferric oxide film combination at a temperature of at least 300°C in an oxidation-reduction atmosphere whereby said alpha ferric oxide film is converted to a film of magnetite.

10. The method of claim 9 wherein said film of alpha ferric oxide is between 1,000A and 8,000A in thickness.

11. The method of claim 9 wherein said oxidation-reduction atmosphere is selected from the group consisting of hydrogen and water, carbon monoxide and water, and carbon monoxide and carbon dioxide.

12. The method of claim 9 further comprising the steps of maintaining said support member and magnetite film combination at a temperature of between 200° and 350°C. while exposing said combination to an oxidizing atmosphere for a period of between 1 and 10 hours, whereby said film of magnetite is converted to a film of gamma ferric oxide.

13. The method of claim 9 wherein said iron compound is selected from the group consisting of ferrocene, iron pentacarbonyl, ferric chloride, ferric acetylacetonate, ferrous acetylacetonate, ferric hexafluoroacetylacetonate, and ferrous hexafluroacetylacetonate.

14. The method of claim 9 wherein said support member is selected from the group consisting of aluminum, glass, glass-ceramic and ceramic.

15. The method of claim 9 wherein said support member is an ion exchange strengthened material selected from the group consisting of glass and glass-ceramic.

16. The method of claim 9 wherein said support member and alpha ferric oxide film combination is maintained at a temperature between 525° and 600°C in said oxidation-reduction atmosphere to convert said alpha ferric oxide film to a film of magnetite.

17. The method of making a magnetic recording and storage device comprising the steps of providing a disk formed from an inorganic and non-magnetic ion exchange strengthened material selected from the group consisting of glass, and glass-ceramic, heating said disk to a temperature of approximately 450°C. in an oxygen-free atmosphere, exposing said heated disk to ferrocene vapors in said oxygen-free atmosphere, depositing on said disk a film of iron approximately 1,900A in thickness, and heating said iron film and disk combination to approximately 525°C. and subjecting said combination to a hydrogen and water atmosphere having a hydrogen to water partial pressure ratio of between 5:1 and $5 \times 10^{-5}$:1, whereby said iron film is converted to magnetite.

18. The method of claim 17 further comprising the step of maintaining said disk and magnetite film combination at a temperature of approximately 275°C. while exposing said combination to air for a period of approximately 3 hours, whereby said film of magnetite is converted to a film of gamma ferric oxide.

19. A method of making a magnetic recording and storage device comprising the steps of providing a disk formed from an inorganic and non-magnetic ion exchange strengthened material selected from the group consisting of glass and glass-ceramic, heating said disk to a temperature of approximately 450°C. in an oxygen-free atmosphere, vaporizing a quantity of ferrocene powder by heating said powder to a temperature above 150°C., exposing said heated disk to the ferrocene vapors in said oxygen-free atmosphere, depositing on said disk a film of iron approximately 1900A in thickness, maintaining said disk and deposited iron film combination at a temperature of approximately 450°C. while exposing said combination to an oxidizing atmosphere for approximately one and ½ hours, whereby said iron film is converted to a film of alpha ferric oxide, and heating said alpha ferric oxide film and disk combination to approximately 525°C. and exposing said combination to a hydrogen and water atmosphere having a hydrogen to water partial pressure ratio of between 5:1 and $5 \times 10^{-5}$:1, whereby said alpha ferric oxide film is converted to magnetite.

20. The method of claim 19 further comprising the steps of maintaining said disk and magnetite film of a temperature of approximately 275°C. in air for a period of approximately 3 hours, whereby said film of magnetite is converted to a film of gamma ferric oxide.

21. A method of making a magnetic recording and storage device comprising the steps of providing a disk formed from an inorganic and non-magnetic ion exchange strengthened material selected from the group consisting of glass and glass-ceramic, heating said disk to a temperature of approximately 450°C. in an oxidizing atmosphere, exposing said heated disk to iron pentacarbonyl vapors in said oxidizing atmosphere, whereby a film of alpha ferric oxide approximately 4,000A in thickness is deposited on said disk, and heating said alpha ferric oxide film and disk combination to approximately 525°C. and exposing said combination to a carbon monoxide and carbon dioxide atmosphere having a carbon monoxide to carbon dioxide vapor pressure ratio in the range of 1:1 and $10^{-5}$:1 for approximately 1 hour, whereby said alpha ferric oxide film is converted to magnetite.

22. The method of claim 21 further comprising the steps of maintaining said disk and magnetite film at a temperature of approximately 275°C. in air for a period of approximately 3 hours, whereby said film of magnetite is converted to a film of gamma ferric oxide.

23. A method of making an iron oxide magnetic recording and storage device comprising the steps of providing an inorganic and non-magnetic support member, heating said support member to a temperature of at least 300°C, exposing a surface of said heated support member to the vapors of an iron compound selected from the group consisting of ferrocene and iron pentacarbonyl, maintaining said heated support member in an oxygen free atmosphere while exposing it to said iron compound vapors, whereby a film of iron will be formed on said support member, maintaining said support member and iron film combination at a temperature of at least 300°C while exposing said combination to an oxidizing atmosphere for between 1 and 2 hours, whereby said iron film is converted to alpha ferric oxide, and maintaining said support member and alpha ferric oxide film combination at a temperature of at least 300°C in an oxidation-reduction atmosphere whereby said alpha ferric oxide film is converted to a film of magnetite.

24. A method of making an iron oxide magnetic recording and storage device comprising the steps of providing an inorganic and non-magnetic support member, heating said support member to a temperature of at least 300°C, exposing a surface of said heated support member to the vapors of an iron compound selected from the group consisting of ferrocene and iron pentacarbonyl, maintaining said heated support member in an oxygen free atmosphere while exposing it to said iron compound vapors, whereby a film of iron will be formed on said support member, and maintaining said support member and iron film combination at a temperature of at least 300°C in an oxidation-reduction atmosphere whereby said iron film is converted to a film of magnetite.

* * * * *